(No Model.)
J. J. OCHS.
ATOMIZER.
No. 384,777. Patented June 19, 1888.
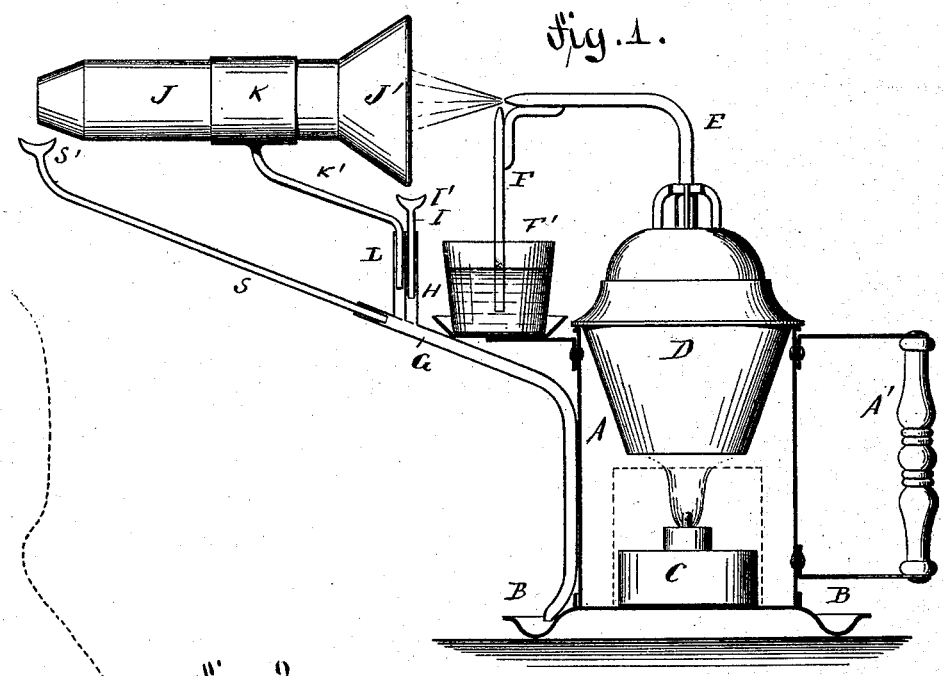
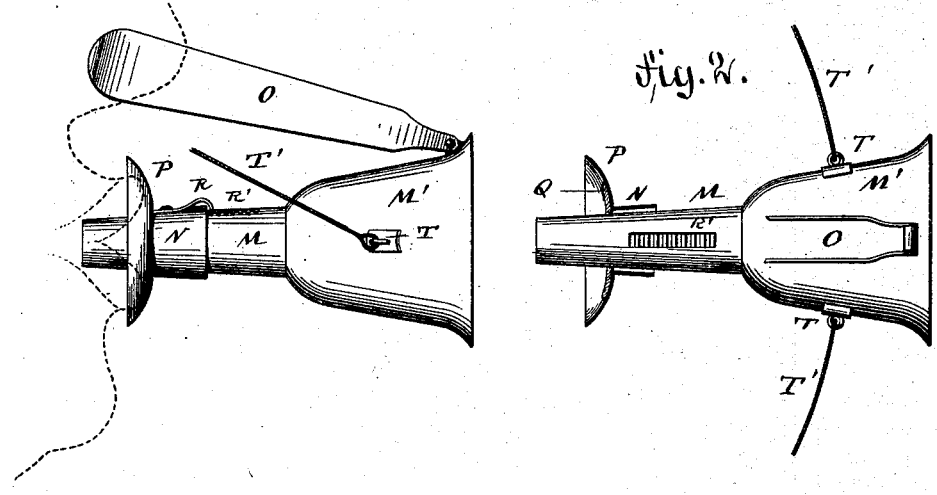
WITNESSES:
H. N. Rosenbaum.
Carl Marx
INVENTOR.
John Jacob Ochs.
BY Goepel & Raegener.
ATTORNEYS.

UNITED STATES PATENT OFFICE.

JOHN JACOB OCHS, OF NEWARK, NEW JERSEY.

ATOMIZER.

SPECIFICATION forming part of Letters Patent No. 384,777, dated June 19, 1888.

Application filed March 17, 1888. Serial No. 267,470. (No model.)

*To all whom it may concern:*

Be it known that I, JOHN JACOB OCHS, of Newark, in the county of Essex and State of New Jersey, have invented certain new and useful Improvements in Atomizers and Mouth-Pieces, of which the following is a specification.

This invention relates to improvements in the apparatus used for curing diseases of the throat and lungs by inhalation; and the object of my invention is to provide a new and improved atomizer of such construction as to prevent drippings from the same wetting the bedclothes or garments of the patient; and a further object of my invention is to provide a new and improved mouth-piece which is to be used with the atomizer and compels the patient to inhale the vapors or atomized liquids.

The invention consists in the construction and combination of parts and details, as will be fully described and set forth hereinafter, and then pointed out in the claims.

In the accompanying drawings, Figure 1 is a vertical transverse sectional view of my improved atomizer. Fig. 2 is a top view of my improved mouth-piece, parts being broken out and others being in section. Fig. 3 is a side view of my improved mouth-piece.

Similar letters of reference indicate corresponding parts.

The sheet-metal cylindrical casing A is provided on one side with the handle A', of any well-known construction, and is also provided with the outwardly-projecting base B, forming an annular gutter around the bottom part of the casing. A spirit-lamp, C, is placed within the casing A, and on the top of the casing the small steam-generator D is placed, which is provided with the outlet-pipe E, having a tapered end, adjacent to which the upper end of a vertical pipe, F, is held, the lower end of which is dipped into water or other liquid in a vessel, F'.

In place of tubes E and F, any other well-known spraying device may be used.

Opposite the handle A' the conducting-tube G is secured to the side of the casing, and its upper end is bent upward and outward, and from the same a short tubular standard, H, projects upward. Into the standard H the tube I is placed, a gutter, I', being formed on the upper end of the tube I for the purpose of catching the drippings from the flared end J' of the guide-tube J, supported by a sleeve, K, on the upper end of a curved rod, K', having its lower end passed into a tubular standard, L, on the upper curved end of the tube G, and adjacent to the tubular standard H. One end of a connecting-tube, S, is inserted in the upper end of the conducting-tube G, and on the opposite end of the tube S the gutter S' is formed for catching the drippings from the smaller end of the guide-tube J. All the drippings are thus conducted through the tubes S and G to the gutter formed by the base of the casing A and cannot wet the bedclothes or garments of the patient. As the handle is on that side of the casing opposite the one at which the spraying device is located, the entire apparatus can very conveniently be brought into the most favorable position.

The mouth-piece to be used with my improved atomizer consists of the tube M, preferably made slightly tapering, and the bell-shaped mouth M' on the wider end of said tube. On the tube M the sleeve N is mounted to slide, and is provided at its inner end with a guard, P, provided on its inner surface with the packing Q. The sleeve N is provided with the spring-catch R, that can engage the teeth in the top of the tube M. The bell-shaped mouth of the tube is provided with two opposite eyes, T, to which the fastening or retaining bands T' are secured. On the top of the bell-shaped mouth the U-shaped spring nose-clamp O is pivoted.

The sleeve N is adjusted on the tube M according to the desired distance the said tube is to be inserted in the mouth, and is held in place by the catch R.

The retaining-bands are tied at the back of the head, or, in case an elastic band is used, the same is passed around the back of the head. The spring O is raised and clamped on the nose, so as to close the nostrils and compel the patient to breathe through the mouth-piece. The smaller end of the guide-tube J is held in the bell-shaped mouth M' of the tube, so that the atomized medicinal liquid contained in the vessel F passes through the mouth-piece into the mouth, throat, and lungs.

Having thus described my invention, I claim as new and desire to secure by Letters Patent—

1. The combination, with the casing A, of the base B, forming a gutter, a spraying device, drip-gutters for the spraying device, and a tube leading from the drip-gutters to the gutter in the base, substantially as herein shown and described.

2. The combination, with the casing A, of a spraying device, the guide-tube J, the drip-gutter I' at the wider end of the guide-tube, the conducting-tube G, the tube I of the drip-gutter, and the tubular standard H on the conducting-tube G, substantially as herein shown and described.

3. The combination, with the casing A, of the conducting-tube G, the tubular standards H and L on the same, the tube I in the standard H, the gutter I' on the tube I, the rod K', the sleeve K, and the guide-tube J, supported by said sleeve, substantially as herein shown and described.

4. The combination, with the casing A, of the conducting-tube G, the standards H and L, the gutter I', the conducting-tube S, having one end inserted in the upper end of the conducting-tube G, and the gutter S' on the opposite end of the said conducting-tube S, substantially as herein shown and described.

5. In a mouth-piece, the combination, with a tube and a bell-shaped mouth on the same, of a sliding guard on the tube, and a locking device for locking the guard in place on the tube, substantially as herein shown and described.

6. In a mouth-piece, the combination, with a tube and a bell-shaped mouth on the same, of a nose-clamp, substantially as herein shown and described.

7. In a mouth-piece, the combination, with a tube and a bell-shaped mouth on the same, of the U-shaped nose-clamping spring O, pivoted on the mouth-piece, substantially as herein shown and described.

8. The combination, with a tube and a bell-shaped mouth-piece on the same, of the U-shaped nose-clamping spring O, pivoted on the same, and the retaining-bands T', substantially as herein shown and described.

In testimony that I claim the foregoing as my invention I have signed my name in presence of two subscribing witnesses.

JOHN JACOB OCHS.

Witnesses:
WM. A. KASINGER,
J. V. DIEFENTHALER.